(12) United States Patent
Samid

(10) Patent No.: US 12,229,285 B1
(45) Date of Patent: Feb. 18, 2025

(54) POLAR LATTICE CRYPTOGRAPHY

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 18/585,185

(22) Filed: Feb. 23, 2024

Related U.S. Application Data

(63) Continuation-in-part of application No. 18/227,694, filed on Jul. 28, 2023, now Pat. No. 11,917,047.

(51) Int. Cl.
*G06F 21/60* (2013.01)
*H04L 9/30* (2006.01)
*H04L 9/40* (2022.01)

(52) U.S. Cl.
CPC .......... *G06F 21/606* (2013.01); *H04L 9/3093* (2013.01); *H04L 9/40* (2022.05)

(58) Field of Classification Search
CPC ..................................... G06F 21/606
See application file for complete search history.

(56) References Cited

U.S. PATENT DOCUMENTS

| | | | |
|---|---|---|---|
| 10,103,886 B1* | 10/2018 | Gutoski ............... | H04L 9/0838 |
| 2008/0294956 A1* | 11/2008 | Chester ................... | H04L 9/12 |
| | | | 714/746 |
| 2019/0312727 A1* | 10/2019 | Del Pino ............... | H04L 9/3093 |
| 2020/0259649 A1* | 8/2020 | Garcia Morchon .. | H04L 9/0838 |

* cited by examiner

*Primary Examiner* — Bradley W Holder

(57) ABSTRACT

A system and a method to build a recovery capability for a compromised network based on user controlled ad-hoc randomness combined with simplicity; immunized against stealth cryptanalysis which overshadows the prevailing security solutions. Using a randomized polar lattice geometry as a secret arrangement for the key bits, to approach one-time-pad security through built-in equivocation.

8 Claims, 9 Drawing Sheets

Fig-1. A Three Ring Polar Lattice

Fig 2: Four Rings Polar Lattice

10 Rings Polar Lattice

Encrypting a Four Letters Alphabet

Letter X: FRLCRRRRRLCLLFLCC
Letter Y: LFLFRFRFRRFRFRCRRFFLLCLLCCLLLLFLFFRRRRFFLF
Letter Z: RCRFRRFRCRCRCRCRCRFRF
Letter W: LFFRFRFLLLCLCLFLLFFRRFL Fig-8    Layered Polar Lattices
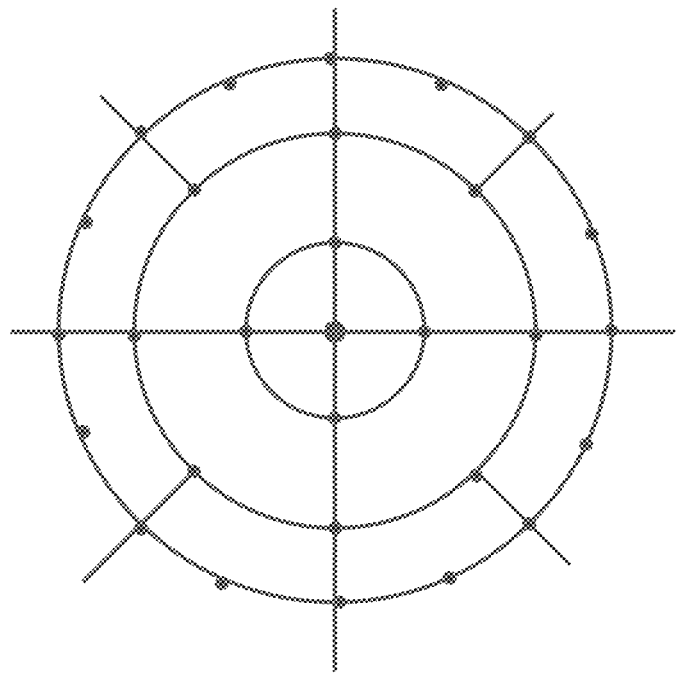
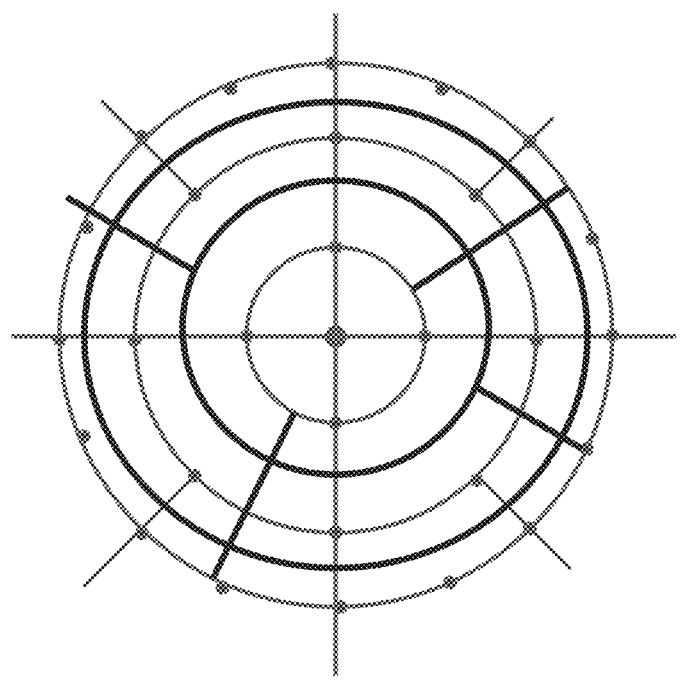

Connected Layered Polar Lattices

POLAR LATTICE CRYPTOGRAPHY

Continuation in Part Of U.S. patent application Ser. No. 18/227,694 filed 2023 Jul. 29

This application is also a continuation in part of U.S. patent application Ser. No. 17/744,777 filed May 16, 2022. This application is also a continuation in part of U.S. patent application Ser. No. 17/510,324 filed Oct. 25, 2021, and it is also a continuation in part of U.S. patent application Ser. No. 17/216,274 filed Mar. 29, 2021, and also continuation in parts of U.S. application Ser. No. 17/001,163 filed 2020 Aug. 24, and also a continuation in part of U.S. patent application Ser. No. 16/855,517 filed Apr. 22, 2020, which is a continuation of application Ser. No. 16/687,690, which is a continuation of application Ser. No. 16/444,892.

THIS DEFINES A CONTINUATION ZONE ENCOMPASSING THE CURRENT APPLICATION AND application Ser. Nos. 18/227,694, 17/744.77, 17/510,324, 17/216, 274, 17/001,163, 16/855,517, 16/687,690, 16/444,892, AND ALL THE PROVISIONAL APPLICATIONS REFERENCED IN application Ser. No. 16/444,892, CROSS REFERENCED HERE:

Also

CROSS REFERENCE TO PROVISIONAL APPLICATIONS

No. 63/467,624 filed 2023 May 19; Provisional Application No. 63/521,825 filed 2023 Jun. 19. Provisional Application No. 62/688,387 filed on Jun. 22, 2018; Provisional Application No. 62/689,890 filed on Jun. 26, 2018; Provisional Application No. 62/714,735 filed on Aug. 5, 2018; Provisional Application No. 62/782,301 filed on Dec. 19, 2018; Provisional Applications No. 62/805,369 filed on Feb. 14, 2019; Provisional Application No. 62/813,281 filed on Mar. 4, 2019; Provisional Application No. 62/782,301 filed on Dec. 19, 2018; Provisional Application No. 62/813,281 filed 4 Mar. 2019; Provisional Application No. 62/850,720, filed May 21, 2019; Provisional Application No. 62/857,898 filed 6 Jun. 2019. Provisional application 63/140,006 filed 2021 Jan. 21; No. 63/306,501 filed 2022 Feb. 4, No. 63/292, 954 filed 2021 Dec. 22, No. 63/276,662, 2021 Nov. 8 and No. 63/306,501 filed 2022 Feb. 4.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Public facing networks are vulnerable to persistent hackers, and one must account for occasional breaches. It is important to be prepared with a breach recovery plan, which needs to be based on a hard core for which one has the most robust assurances of resilience and availability when needed. Such assurance can only be based on a security system that is immunized to stealth cryptanalysis which overshadows the prevailing solutions.

BRIEF SUMMARY OF THE INVENTION

This Invention upgrades the network skeleton security established in the continued applications, by building a cryptographic solution which shifts security responsibility from the cipher designer to the cipher user. Presenting a pattern-devoid cryptographic cipher. It is based on a geometric construct—a polar lattice, on which the letters of a plaintext alphabet A, are presented as two points each letter, so that to transmit a letter the transmitter transmits a randomized pathway, a trail, (ciphertext) that begins at the first point of the transmitted letter and ends at the second point of the transmitted letter; the transmitted pathway is a set of steps on the lattice. Once a letter is transmitted the next bits on the ciphertext mark the beginning of the pathway that points to the next letter. The size and the geometric construction of the polar lattice are randomized and kept secret. The randomized pathways may be long or short, the attacker does not know how to parcel the ciphertext to individual trails pointing to distinct letters in the plaintext alphabet A. The polar lattice may be implemented algebraically, or geometrically; the lattice may be a physical nano-construct. The polar lattice is extremely power efficient, very fast. It claims all the attributes associated with pattern devoid cryptography: it allows for only brute force cryptanalysis, which in turn can be defeated through increased ciphertext size, and unlimited key size and structure complexity.

This figure shows a 3 rings polar lattice. The center of the lattice, o, is shown here as Ring-0, $R_0$ from where a horizontal line is drawn to the right, on which three points are drawn, and each of those points marks the position of a concentric ring. Point (1,1) marked ring-1, $R_1$, point (2,1) marks ring $R_2$ and point (3,1) marks ring $R_3$. Ring-1 marks a full size arc 360 degrees. It is divided to two equal size arcs by point (1,2). All the points in this example divide the arc before them to two equal parts thereby creating a symmetric polar lattice. Such a lattice can be used as a cipher key, but generally the each arc is divided to sub arcs on a random basis.

Figure 2:
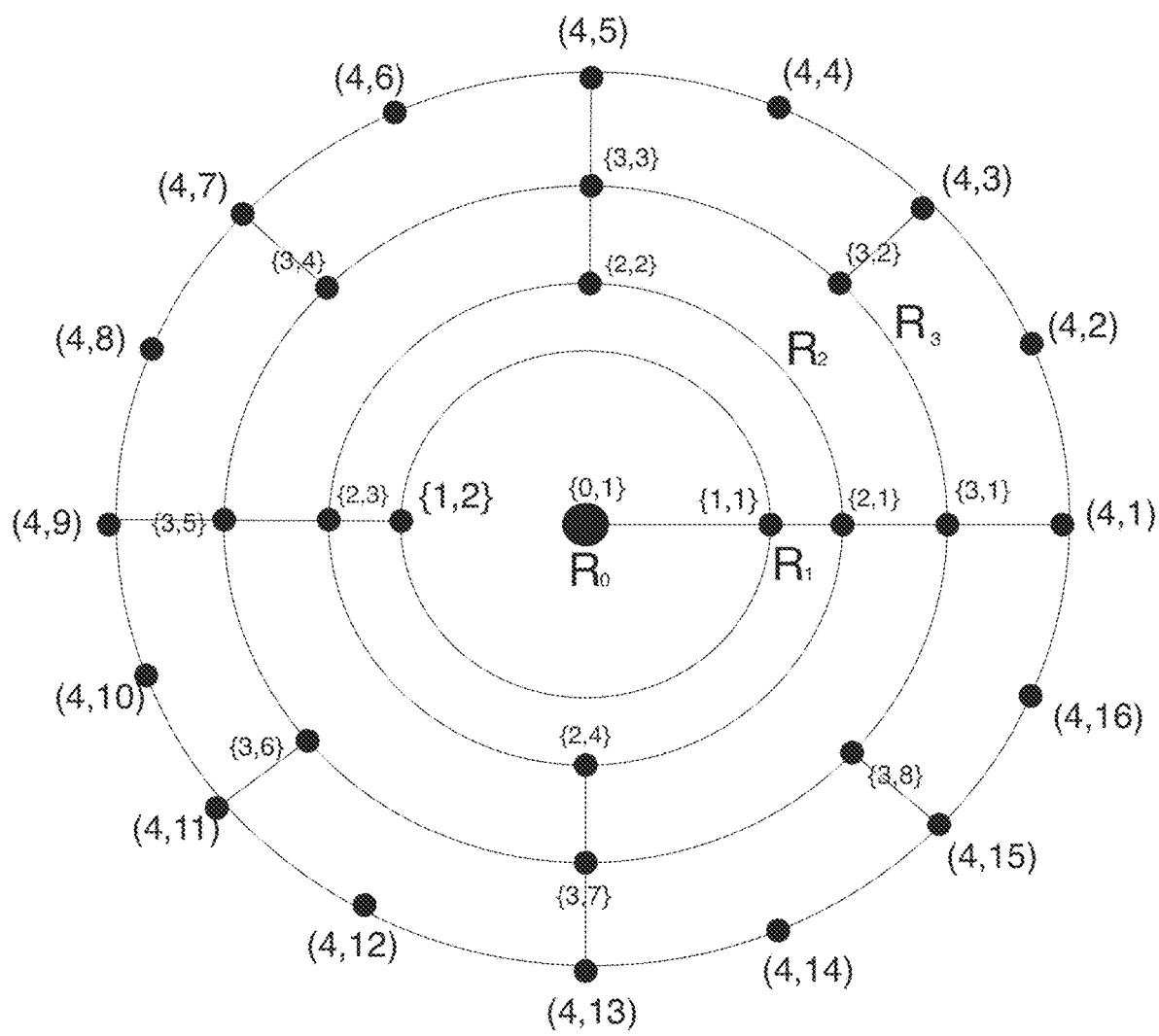

FIG. 2 Four Rings Polar Lattice

Figure 1:
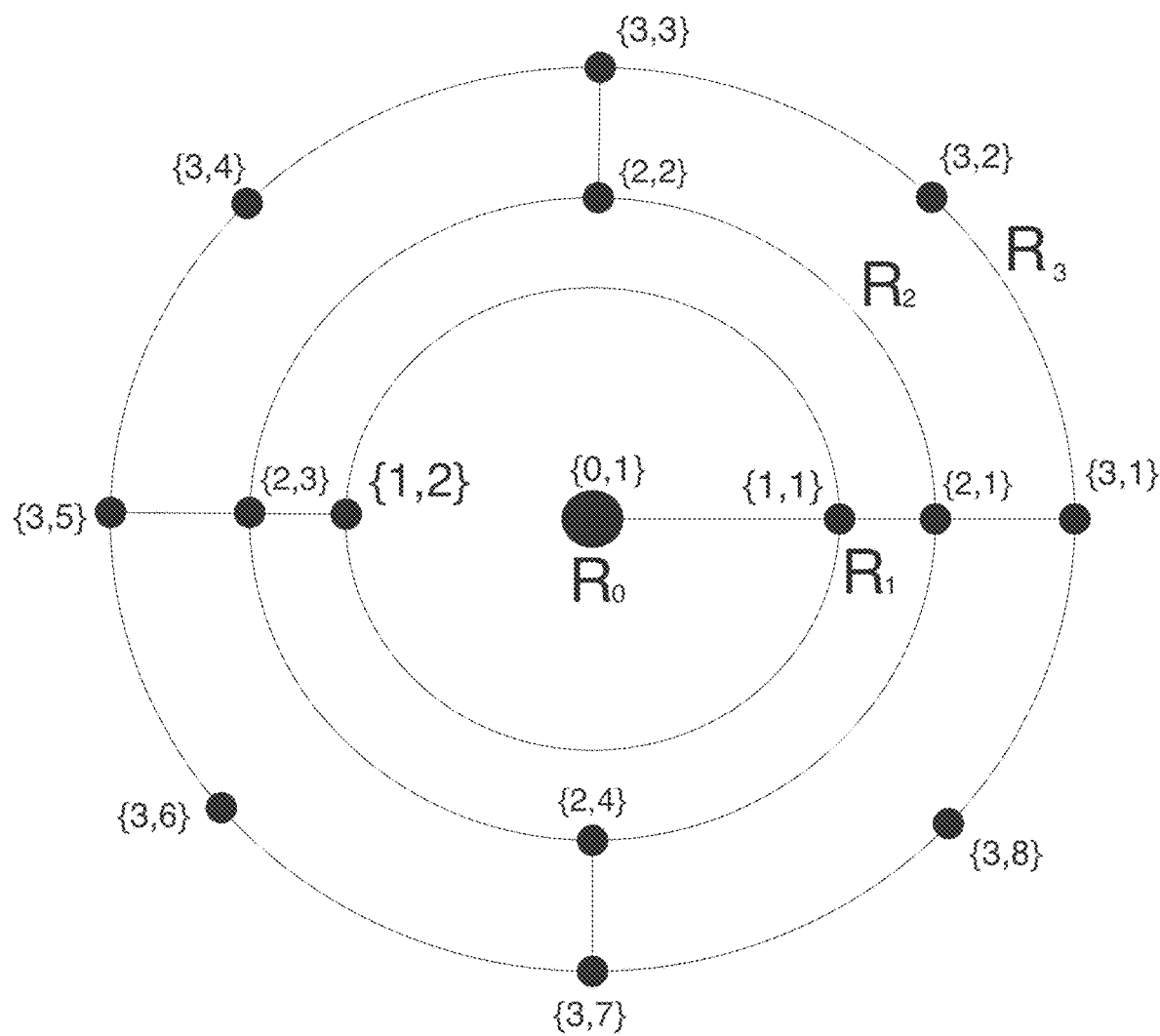
FIG. 1: A Three Rings Polar Lattice

This figure shows how another ring is added to the three rings polar lattice shown in FIG. 1. Again each arc section is divided to exactly two subsection, so ring-1 has $q_1=2$ points, ring-2 has $q_2=4$ points, ring 3 has $q_3=8$ points, and ring 4 has $q_4=16$ points.

Figure 3:
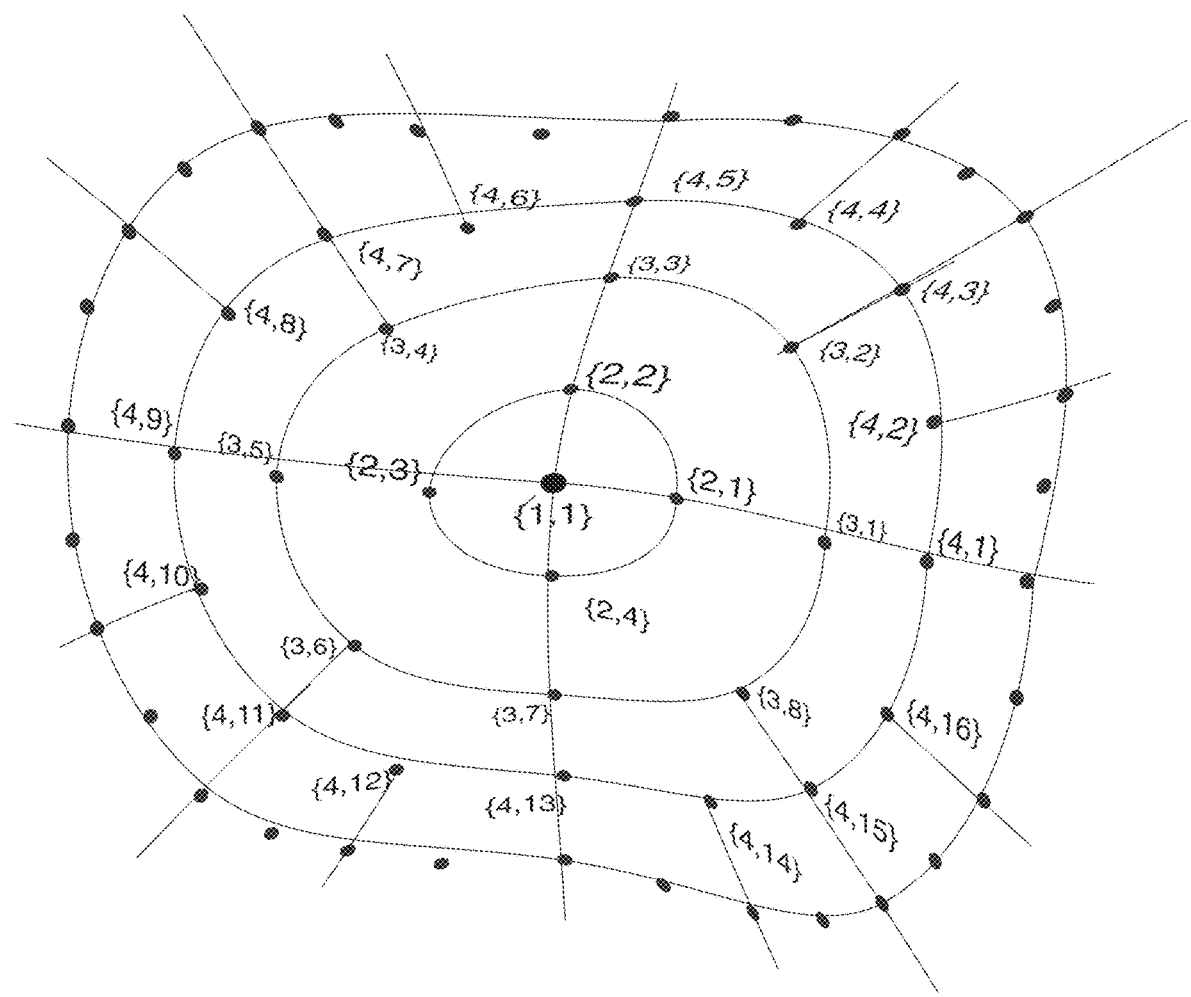

FIG. 3. Topological Resilience of the Polar Lattice

FIG. 3 This figure shows the polar lattice, PL, in FIG. 2 following a topological surface stretch and deformation. While the rings are no longer a perfect circles, the geometric relationships among the PL points are preserved. This allows the polar lattice to build another security wall when the surface is mapped to cartesian coordinates.

Figure 4:
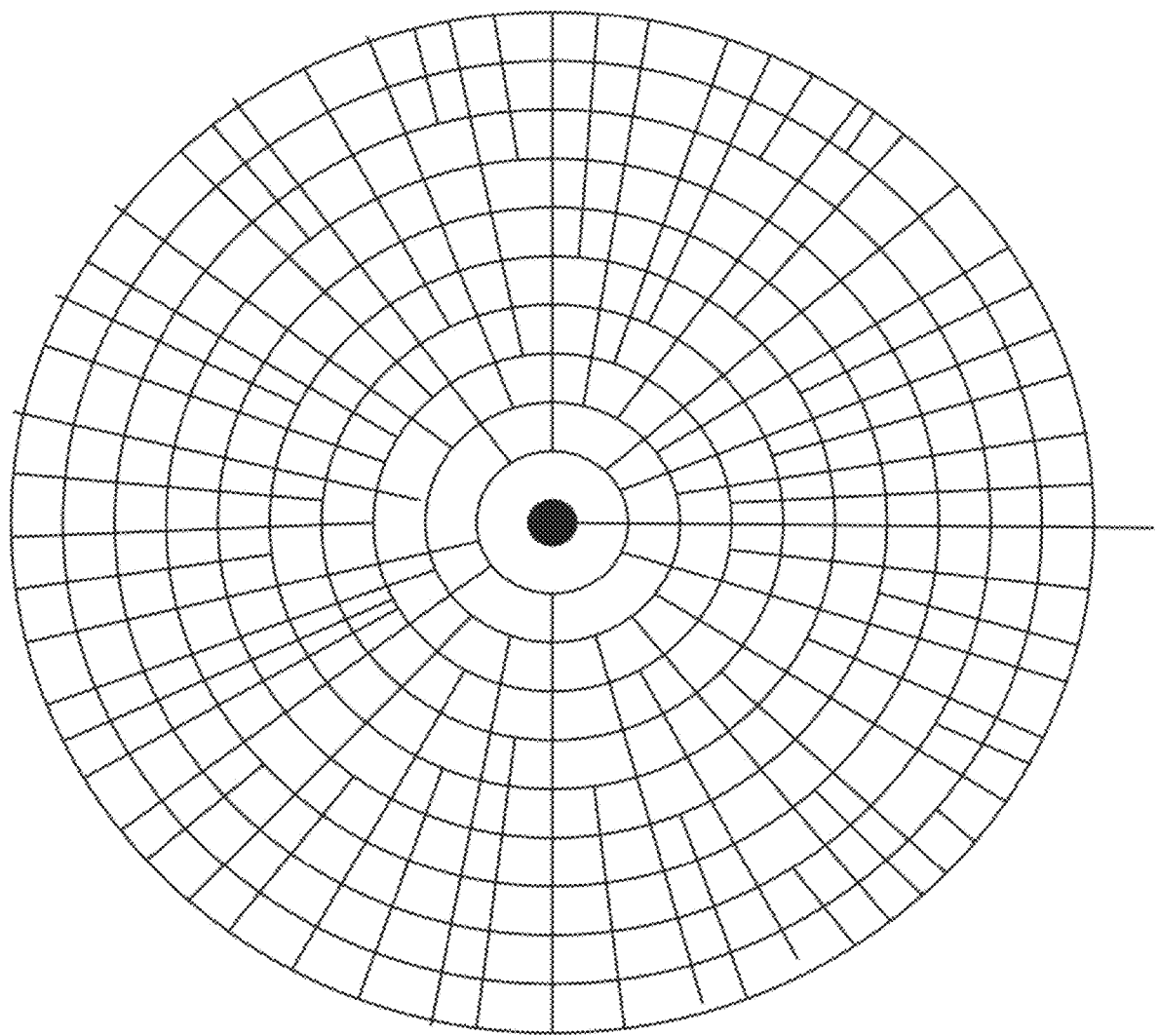

FIG. 4: 10 Rings Polar Lattice

This figure shows a 10 rings polar lattice where each section is divided to 0, 1, 2, or 3 subsection, and the division behaves randomly.

Figure 5:
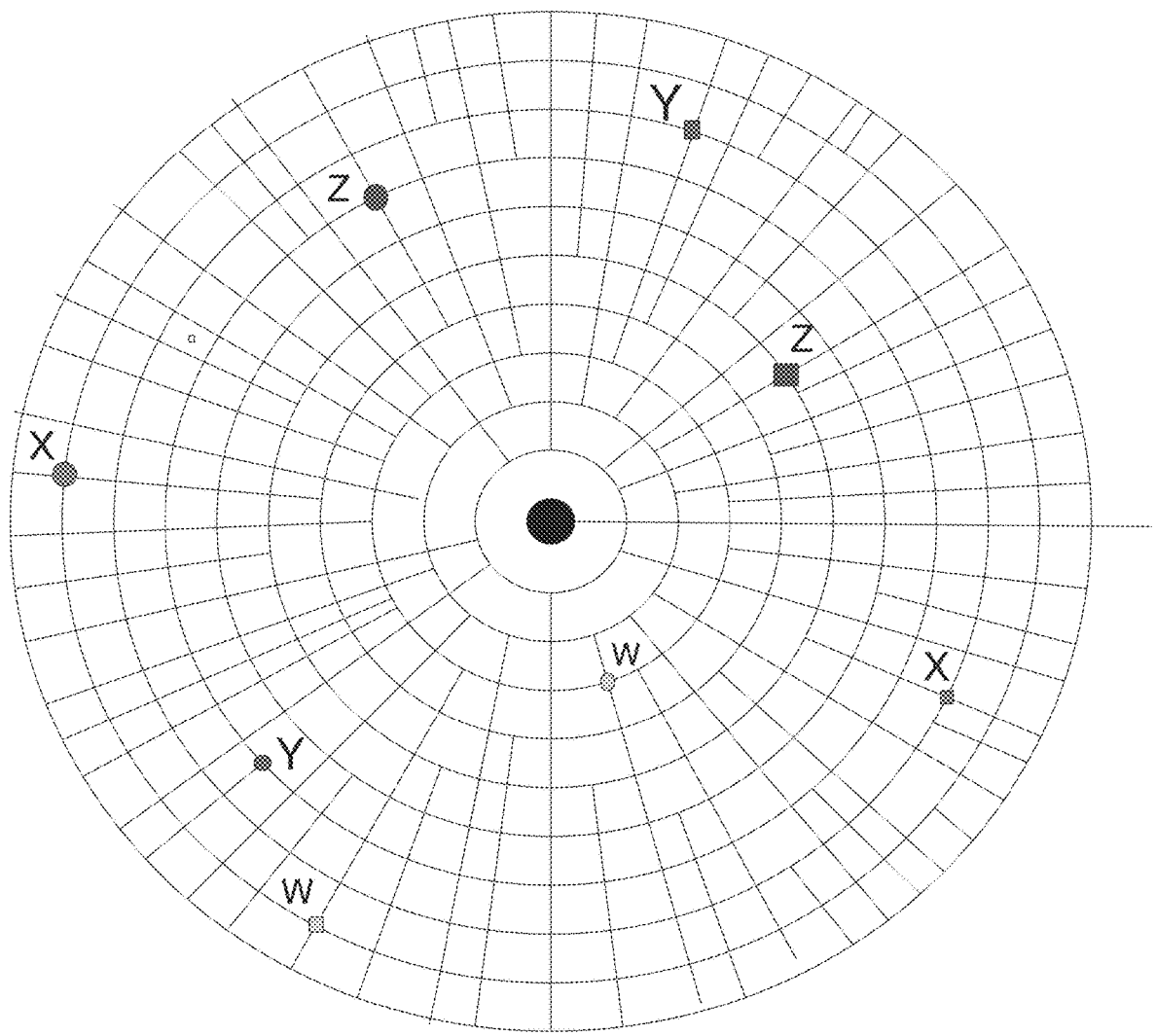

FIG. 5: Polar Lattice Key (4 letters alphabet)

This figure shows a polar lattice with four plaintext alphabet letters marked on it. The plaintext alphabet is comprising 4 letters: X, Y, Z, and W. Each letter is associated with a starting point on the lattice, identified by a circle on that point, and each letter is associated with a finish point on the lattice identified by a square on that point. The randomness of the polar lattice space and the randomness of the placement of the 8 markers, creates in summary the randomness of the polar lattice key.

Figure 6:
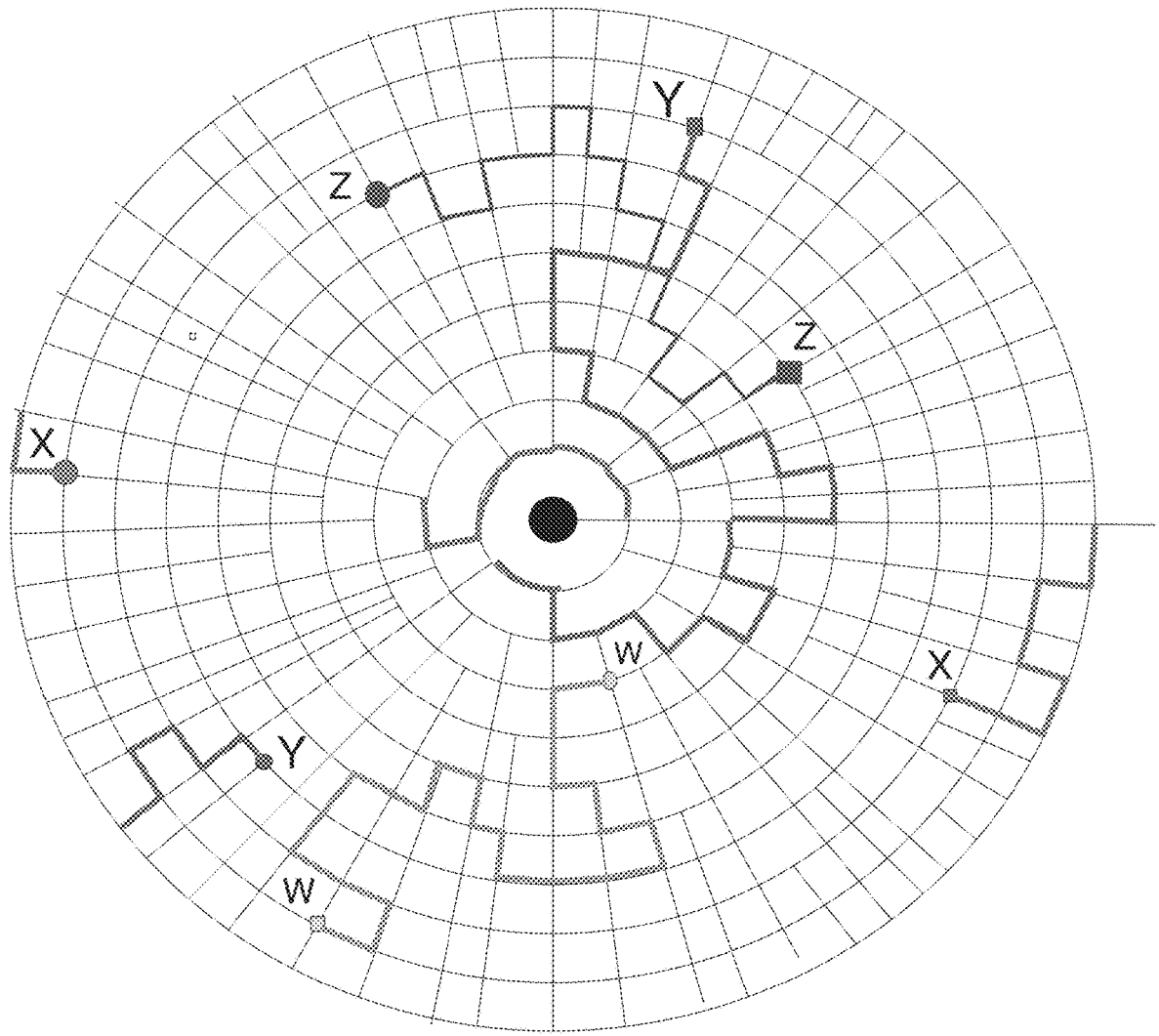

FIG. 6: Encrypting a four letters alphabet

This figure shows a plaintext alphabet comprising 4 letters, X, Y, Z, and W. Each is associated with a starting point (circle) and a finish point (square). Each letter is associated with a train on the polar lattice space that leads from its starting point to its finish point. The trail is marked with the Right, Left, Close, Far markers (R, L, C, F), this is the steps alphabet where each letter is expressed in two bits. The trails are drawn on the figure and are written as a ciphertext:

Letter X: FRLCRRRRRLCLLFLCC
Letter Y: LFLFRFRFRRFRFRCRRFFLLCLLCCLLLL-FLFFRRRRFFLF
Letter Z: RCRFRRFRCRCRCRCRCRFRF
Letter W: LFFRFRFLLLCLCLFLLFFRRFL Note that on the upper side of the lattice above the horizontal line right R is interpreted as clockwise while L is interpreted as counter clockwise, but in the lower part, below the horizontal line the interpretation flips, right is counterclockwise and left is clockwise. Only one with the possession of the lattice will know to interpret these markers right. Also note that this cryptanalytic burden can be increased by replacing the close and far directions to 'up' and 'down' which flip their meaning dependent on the location, whether it is on the upper half of the polar lattice or on the lower half thereto.

To send a message that say "XXZX" the transmitter will send:

FRLCRRRRRLCLLFLCCFRLCRRRRRLCLLFLCCR-CRFRRFRCRCRCRCRCRFRFFRLC RRRRRLCLL-FLCC

Note that the X trail is using the extended step alphabet. After two steps the traveler hits the outer ring, when he encounter 'far', F he jumps to the 2nd ring at its closest point. The traveler moves down to the 1st ring, where he encountered a 'close' step, which in fact send the traveler to the outer ring from where the traveler arrives at the finish point for letter X.

Figure 7:
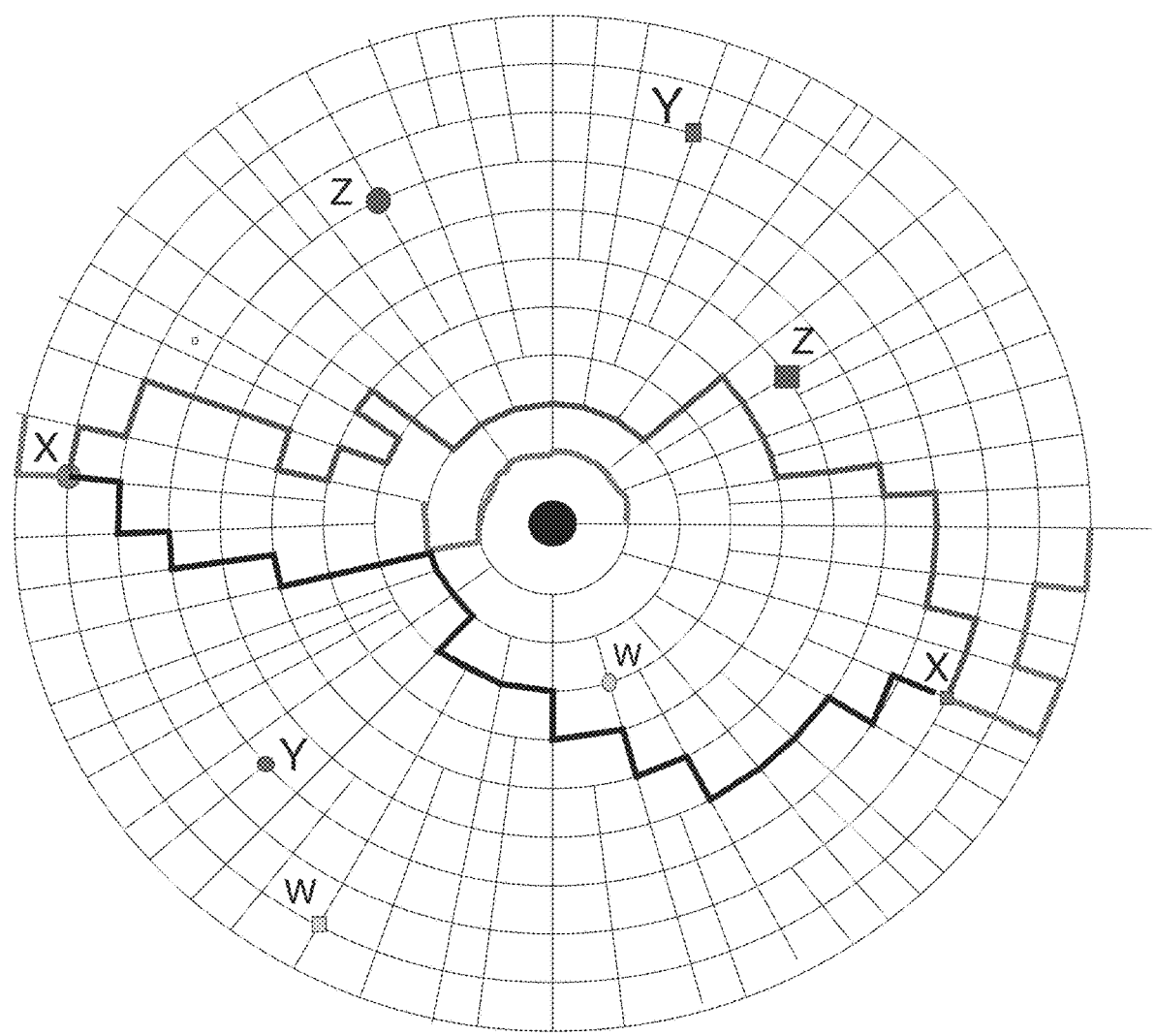

FIG. 7: many trails per letter

This figure shows three different trails, all of which transmit the same letter X. All the trails begin with the starting point of letter X and finish at the finish point of letter X.

FIG. 8. Layered Polar Lattices

This figure shows on polar lattice in red, on top with a polar lattice below as a copy of the upper lattice with added two rings and added two rays. All the points of lower PL that have a matching point at the upper lattice are connected with lines. All the added points in the lower lattice are not connected.

Figure 9:
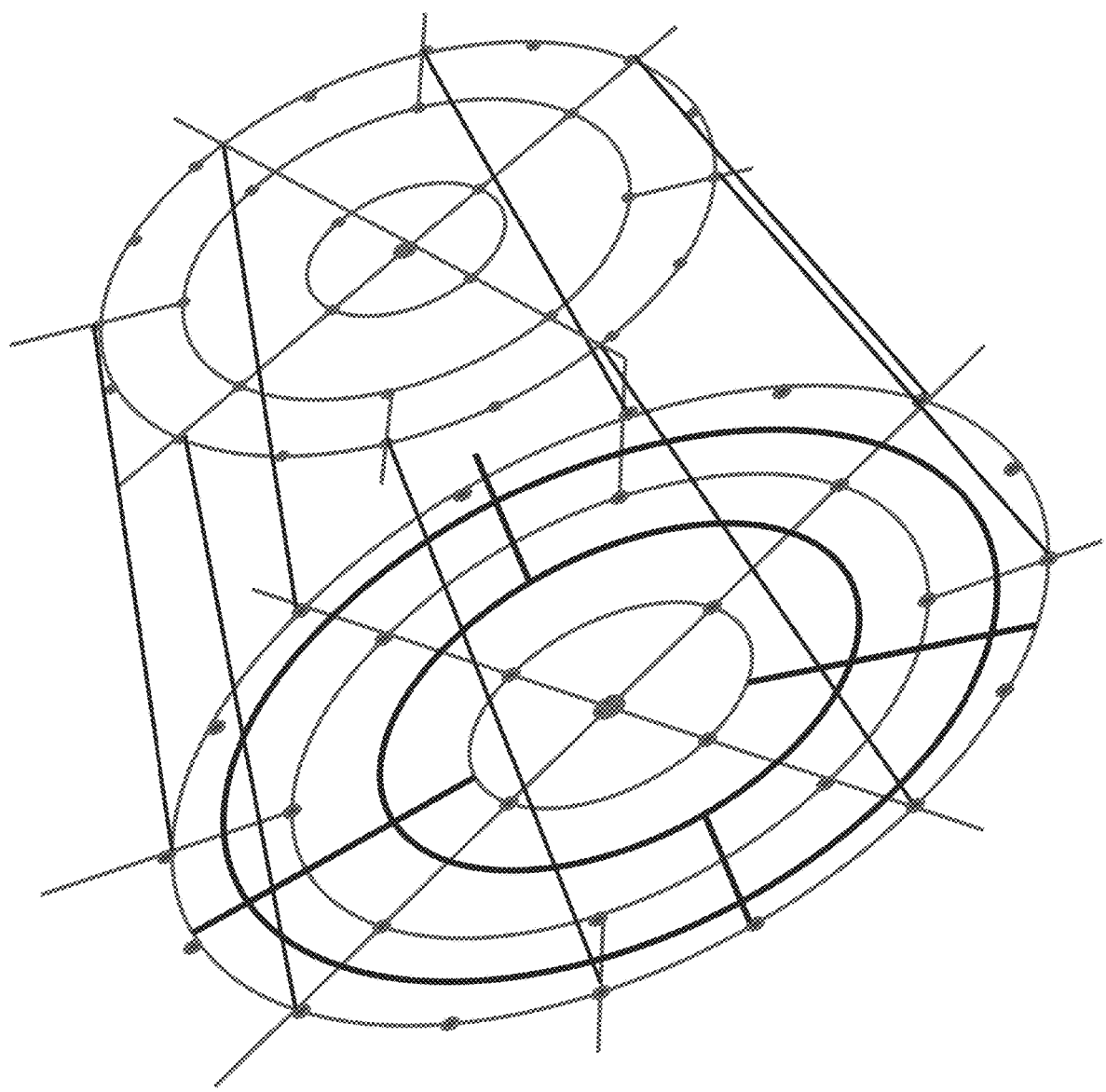

FIG. 9 Connected Layered Polar Lattices

The two polar lattices of FIG. 8 are shown in perspective with some of the matching points shown as connected. It is visible that from any point on either PL it is possible to move through neighbors to any other point on either PL.

DETAILED SPECIFICATION OF THE INVENTION 1.0 Introduction

The Polar Lattice cryptography is a case that belongs to the pattern-devoid class and in it to the per-letter randomized pointer class. Pattern devoid cryptography is where randomness is used in more than selection of a fixed size key. Most if not all of its operation is randomized, washing away any pattern to be homed in by a cryptanalyst.

This invention innovates the notion of the key, and exploits geometry to pack entropy to build unlimited cryptanalytic barriers. The key is a geometric structure: a polar lattice. Each letter of the plaintext alphabet is represented as a two points on that lattice: starting point and finish point. A transmitter sends a recipient a given letter by sending over a randomized path, a trail, on the polar lattice such that when applied from the starting point of the letter, it ends up at the finish point of that letter. There is an infinity of possible pathways leading from the starting point of a letter to its finish point, hence there are infinite number of trails (ciphertext) that all point to the same letter. The transmitter may choose a short trail or a long trail—randomly or arbitrarily. Any given letter of the plaintext alphabet may be represented by more than one pair of starting point and finish point, so the transmitter can not only choose a different trail each time, but can also switch to a different pair for the same letter. To send a message the transmitter sends one letter trail after the other, thereby indicating a series of letters being sent to the recipient. The attacker has no way to parcel out the series of trail to specific letters. The attacker does not know how the polar lattice is structured, and does not know where on the polar lattice lie the starting points and the finish points of the letters of the plaintext alphabet. The combined entropy of the structural information of the arbitrary and secret size polar lattice, the locations of the starting points and finish points on the lattice for the letters of the alphabet, and the number of such pairs amounts to an open-ended entropy that can match any given ciphertext stream to a sufficient number of plausible messages that had a likelihood to be the plaintext that was encrypted into the given ciphertext. This high-entropy generated residual equivocation elevates polar lattice cryptography to a tool that can deliver mathematical secrecy in line with other bona fide pattern-devoid ciphers.

We first describe the elements: the polar lattice, the key, the encryption and decryption process. Then we describe the way the cipher is being used in practice, followed by an analysis of this new capability.

2.0 Elements 2.1 The Polar Lattice

The polar lattice is a structure comprising r concentric rings, from the smallest ring 1 to the largest ring r, all rings regard point o as their center. The polar lattice is marked with q rays—straight lines emanating from point o, where each ray is recognized as a straight line leading from some ring g to the most outward ring r, and is not recognized between the center point and ring g.

The polar lattice includes at least ray-1 which is the ray that is horizontal and stretches right way, and is considered the ray of direction $\alpha=0$. Each ray j is marked at a direction $a_y$ where $j=1, 2, \ldots q$ and $$0 \le \alpha_j \le 360$$

The polar lattice includes at least ring 1 which intersects with ray-1 to define the first point of the first ring, $p(1,1)$.

The q rays and r rings are meeting each other over h points.

This construction is designated as a polar lattice, or a polar lattice space (PLS)

Each of the h points defined on the polar lattice may be identified as $p(i,j)$ where i represents the ring, $i=1, 2, 3 \ldots r$ and j represents the count of points on the ring. $j=1, 2, \ldots q_i$, where $q_i$ represents the number of points on ring i. The points are counted from the ray-1, counterclockwise.

Neighbors

Two polar lattice (PL) points are considered ring neighbors, if between them on their shared ring, there is no other point.

Two polar lattice (PL) points are considered ray neighbors, if they share the same direction, α, and are situated on consecutive rings.

Steps

We now define four steps over the polar lattice. A step is movement from one lattice point to a neighboring lattice point. Each point may have two ring neighbors and two ray neighbors. Hence a step may be defined via four indicators, we call them: right, left, close, far) (R, L, C, F). R represents moving to the right to a ring neighbor, and L represents moving to the left to a ring neighbor. C represents moving to the next smaller concentric ring on the same ray and far represents moving to the next larger ring on the same ray.

For area of the lattice above the horizontal line the Right, R step is clockwise, and the Left, L, step is counterclockwise. These designation flip on the lower part of the lattice, below the horizontal line where R means counter counterclockwise and L means clockwise. Without knowing where the starting point lays it is impossible to know which direction the R and L indicators point to.

Note: this same flip can be used also for indicating movement between rings. We use here close and far, C and F which is the same interpretation anywhere on the lattice. But one could use Up and Down, U and D, which also flip their interpretation when applying to a point on the lower half of the lattice as opposed to the higher half.

Trips (Pathway, Trails)

A pathway, trail or a trip on the PL is a sequence of steps leading from point x to point y on the PL. The way the PL is constructed it is clear that there is a pathway (trip) between any two arbitrary points, x, y on a polar lattice.

Extended Steps

Points on the outer ring have no 'far' neighbor. Also points at the lowest part of a ray don't have a close neighbor. We may remedy this deficiency as follows:

A point on the outer ring will interpret a step 'far' as a step to the closest point on its ray, when closeness is measured towards the center of the concentric rings. Such that a point on the last ring r which is defined over a ray that is drawn from ring g to rind r, will view the point on ring g but on the same ray as the point that replaced the point to move to when the step "far" F is indicated. This "circling" dynamics resembles modular arithmetic.

A point on ring g on a ray that is not drawn from ring g>1 to ring 1, when it encounters the instructions to move a step closer, C, is interpreting it as moving on the same ray to ring r.

It is clear that a sequence close-far CF and the sequence far-close FC will be a two steps trip that would end up at the same point both for a regular point and for the special cases above.

The above definition creates extended steps, and accordingly all points on the polar elements have exactly four neighbors, and every point on the lattice has another point to go to when either one of the four steps is being encountered.

We regard the four steps R, L, C, F as the steps alphabet.

The Universal Nature of Trips

Every point on the polar lattice can be matched with any trip instructions in the form of some sequence of steps right, left, close, far RLCF, such that when following these instructions the traveler will change its location from that starting point to the corresponding end point. Say then a trip associates any polar lattice point with an end point on the polar lattice. And that is regardless of the size or complexity of the polar lattice.

We can also claim that any two arbitrary points on the polar lattice have an infinite number of trips leading from one to the other. This is called the trip infinity premise.

Let trip T lead from point x to point y on a given polar lattice. T is expressed as a string comprising the letters of the steps alphabet. Let $T^r$ be the reverse sequence of T, then we can write:

$$x \rightarrow T = y$$

$$y \rightarrow T^r = x$$

The reverse trail is constructed from the pre-reverse trail by reversing the order of the steps: the last step on the pre-reverse is the first step on the reverse trail, and each step is replaced by its neutralizing match. So for T=CCRF, the reverse will be T(reverse)=CLFF.

Nomenclature

A point on the PLS can be identified as p(i,j) where i is the ring count, and j is the count of rays crossing that ring. i=1, 2, ... r and j=1, 2 ... $q_i$. Modular arithmetic can be used, so p(k,l) is interpreted as i=k MOD r, and j=l MOD $q_i$, where '0' is interpreted as r or $q_i$.

The points on a ring are counted counterclockwise wise and. $α_j > α_i$ for all j>i.

Expressing the Polar Lattice

The polar lattice space can be expressed as a set of point p(i,j,α): ring count, points of ring count, and direction. It is important to keep trac of α in order to identify which point one moves to when the trail indicates C or F steps. Otherwise one cannot identify the neighbors on the same ray.

2.2 The Key

The Polar Lattice cryptography key is comprised of two components: the polar lattice, serving as the 'space' where the letters of the plaintext alphabet are identified with at least one pair of two marked points each. The locations of these marked points is the other component. This way the key that packs a large measure of entropy.

The polar lattice itself is in the open per its principles of construction namely a series of concentric ring matched with a bunch of rays emanating from the center of the rings with each ray recognized from a certain ring outwards to the outer ring. So much is not secret. However, the number of rings is secret. Also the number of rays that cross each ring and the direction, 0≤α≤360 for each ray is also a secret.

Both ring count and ray count is given with modular arithmetic so that the reported numbers themselves don't betray size. A polar lattice with 10 rings can point to ring 9 by specifying 1009. Ray 12 on a given ring with 340 rays can be pointed to as ray 352. Unlike modular arithmetic, in the ray count and ring count there is no zero, rather r, and $q_j$.

We consider a plaintext alphabet A comprising n letters $a_1$, $a_2$, ... $a_n$. We assign each letter two points on the polar lattice, a starting point and a finish point. There are at least n pairs of points (signals), n starting points, $p_i^s$ and n finish point $p_i^f$. for i=1, 2, . . . n.

The pair of the starting point and the finish point per letters are its markers on the lattice. Their location is secret. Any letter of A can be associated with more than one pair of starting and finishing point. But no two letters will have both the same starting point and the same finish point.

3.0 Operation

The operation of the PL cipher is comprised of encryption, transmission and decryption. A plaintext message M comprised as a series of letters from alphabet A is processed through the PL key to generate a corresponding ciphertext, C. C is transmitted by the transmitter who encrypted the message over insecure channels to the intended recipient. The intended recipient decrypts C to M using the shared key.

We further discuss the setup operation to prepare the PL cipher (PLC) for normal operation.

3.1 Encryption

Encryption happens letter by letter over the plaintext alphabet A. To encrypt letter $A_i$ one will draw a trail on the PL space (PLS), starting from a corresponding starting point $p_i^s$ for $a_i$ and ending with the matching finish point $p_i^f$. The trail, T, is comprising a sequence of right, left, close, far (RLCF) steps indicators. The full step language which has four options R, L, C, F can be written with as 2 bits indicators, for example: R=00, L=11, C=01, F=10. Say then that a PL trip is specified with an even bit count bit string.

Having defined trail T leading from $p_i^s$ to $p_i^f$, the transmitter (the encryptor) is then applying T to all other letters in A. Namely, for each letter in A other than $a_i$. If the trail T encounters the finish point of any letter in A other than $a_i$, then this trail is declared as faulty, and the transmitter is marking another trail leading from the starting point $a_i^s$ to the finish point $a_i^f$. The new trial, T'≠T then undergoes the same test as above vis a vis all other letters in A. If the trail hits the finish point of any of the non-i letters, then the trail is declared faulty and another trail is being marked. So it goes T to T' to T'', to T''' and on until a trail T* is found which does not lead to the finish point of any other letter except letter i ($a_i$).

There are infinite possible trails leading from $a_i^s$ to $a_i^f$ to choose from.

T* is transmitted to the recipient as a secret transmission of letter $a_i$.

3.1.1. Trail Drawing

The power of the PL cipher is hinged on the fact that there are infinite trails leading from any point to any point on the PL space (PLS). One could make the trail as long as desired, as convoluted as desired.

The first premise of the PLS is that from every point on that space, there is a path to any other point on that space. proof. let point x be defined by ring i and by a ray of direction (angle). $\alpha_x$, let y be an arbitrary point on ring j with a ray of direction $\alpha_y$. Let i≥j. One could traverse from point x to point y first by moving either to the right or the left until one reaches a point defined by ring i and direction $\alpha_y$. From that point one drops down the rings using "C" steps until one arrives at point y.

To traverse from point y to point x one simply takes the opposite trail, namely using the steps last to first and reversing each step: C→F, F→C, R→L, L→R. By going on the same trail backwards one returns from point y to point x.

We thereby have proven that any two points on the PLS have a connecting trail that can be traversed both ways. Therefore one can pick a random point z on the PLS. Let trail $T_z$ lead from point x to point z. Such trail surely exists. Let trail $T_y$ lead from point z to point y. Therefore the sequence of these trails one after the other, written as $T_yT_z$ will qualify as T leading from point x to point y. However instead of trailing from point z to point y, one could move from point z to point w, and then from point w to point y. The combined trails. $T_yT_wT'_z$, where $T'_y$ is the trail from point w to point y, also qualifies as the desired trail T leading from x to y.

One could add as many in between points like z and w and therebuy prove the premise that there are infinite number of trails between two arbitrary points on the PLS.

Furthermore beyond the minimum length trail the traveler from any point to any other may use a trail as long as desired.

It is because there are infinite trails that it is readily possible to find a trail leading between two points such that the same trail if started from another letter will not lead to the finish point for that letter.

We further elaborate on the base trail between two points on the PL

Shortest Trail

Given a starting point p(i',j'), where i=i' MOD r. and j=j' MOD $q_i$, where r is the number of rings in the PL and $q_i$ is the number of points on ring i, and given a finish point p(k',l'), where k=k' MOD r. and l=;' MOD $q_k$, it is straight forward to draw the shortest trail. from the starting point to the finishing point, p(k, l).

One will identify the angle associated with the ray that defines the starting point $\alpha_s$, and the angle that is associated with the ray that defines the finish point, $\alpha_f$.

One will then move along the starting ring from $\alpha_s$ to $\alpha_f$. This will amount to a series of right steps or to a series of left steps. It is possible to move from $\alpha_s$ to $\alpha_f$ in either direction. Let d be the point on ring i where the ray is at direction $\alpha_f$. A series of right steps or a series of left steps on ring i takes the trip maker from the starting point to d. Once on d, the trip maker moves along that ray though the consecutive rings from ring i to ring k. This is done via a series of "close" (C) steps for the case of i>k, or through a series of "far" F steps in the case where i<k. If i=k no steps.

So traveling on the PLS one moves from the starting point to a finish point in the basic way. The trip looks like one of the following options:

RRRR . . . RCC . . . C
RRRR . . . RFF . . . F
LLLL . . . LCC . . . C
LLLL . . . LFF . . . F

Alternatively one could move from the closest point to the ring of the furthest point and then move right or left along the ring until hitting the point. If the closest point is the finishing point then the reverse trail is used to move from the starting point to the finish point.

3.1.2 Conflict Management

Trail $T_i$ leading from the starting point for letter $a_i$ of alphabet A to its finish point, arbitrarily drawn, as one of the infinite number of options, may also lead from the starting point to the finish point of another letter j≠i. This will create a conflict. Moreover, trail $T_i$ may be comprised of a $T_j$ plus some residual trail $T_r$: $T_i=T_j||T_r$. In that case when the recipient tries the trail on all the letters he finds that a sub section of $T_i$ will qualify as $T_j$. If the mode of transmission is such that the recipient does not know that $T_i$ in totality is the trail, and not any subsection thereto then the recipient might misinterpret $T_i$ as Tj, and may further interpret the subsequence ciphertext stream.

The transmitter, as she draws an arbitrary $T_i$ step by step will simultaneously apply the built up $T_i$ to all letters j in A.

That means will draw the trail from the starting point of all the letters in alphabet A. If $T_i$ or subsection thereto qualify as a $T_j$ trail, then the arbitrary drawing will be changed. The recent step that created the conflict will be erased, and an alternative step will be used to build $T_i$. Such redrawing of a trail can happen several times to ensure that the resultant $T_i$ does not create a confusion for the recipient.

The parties may even agree to regard cases of conflict a 'decoy' bits and ignore them, while leaving the attacker to remain confused about them.

In the event that the trail per letter is submitted with known number of steps then the conflict option should be checked only for the full length of the trail, not a subsection thereto.

3.1.3 Trail Size Management

Communicating parties may hide their communication intensity and frequency by using a constant ciphertext stream from one to another. If a transmitter has nothing to say to a particular recipient she may send him a wriggly trail that fits to no letter.

If a transmitter assesses a message to be extremely sensitive she may send its letters with extremely long trails. If the message is of low sensitivity she may use short trails. Furthermore, the letters of A may be marked on the PLS one time with short distances between the starting points and finish points, or may be marked with medium or long distances between the starting points and the finish points. In the former case the transmitter may send messages with short trails which are not available for the other set of point markings because the distance between them on the PLS is large.

3.2 Transmission

Let M be a message comprised of t letters from the plaintext alphabet A, comprising n letters $a_1, a_2, \ldots a_n$. M is a sequence of m letters from A, designated as $b_i$ being the letter i in M, where this letter is a letter from alphabet A. M then can be written as:

$$M = b_1, b_2, \ldots b_m$$

Encrypting the letters in M with the PL cipher PLC, one yields m consecutive strings comprised of the four letter steps alphabet for the PL, namely right, left, close, far R, L, C, F. This alphabet can be mapped to a four 2 bit letters 00, 11, 10, 01, so that these strings are even counted bit strings. We recall that each string represents a trail that leads from the starting marker to the finish marker of the indicated letter. We therefore write:

$$b_i\text{-PLK} \rightarrow T_i$$

where PLK is the polar lattice key (the structure of the lattice and the locations of all the markers), and $T_i$ is the trail corresponding to letter $b_i$.

To transmit M the transmitter transmit the $T_i$ trails in a series. $M = T_1, T_2, \ldots T_m$ The m trails will have to be transmitted such that the recipient will be able to parcel out the combined string $T_1$-$T_2$-$\ldots T_m$ to the individual letters, as well realize that a new message is sent over and then to distinguish between it and the next message.

We describe three ways for handling these tasks (i) internal alphabet, (ii) cipher signaling, (iii) double-bitting.

3.2.1 Internal Alphabet

The step alphabet is comprised of two counter reverse pairs: {R,L} and {C,F}. taking step R followed by step L brings the traveler of the PLS to the same spot. Same in reverse step: L followed by R. Also for a step close, C followed by far, F and vice versa.

Accordingly given a bit string S representing a PLS trail one could split it at any location to yield two concatenated even count strings: $S = S_1 \| S_2$, and then interject between $S_1$ and $S_2$ a neutral string N of even count of bits, where N is comprised of any number of counter reverse pairs. Examples:

$$N = RL$$

$$N = RLLRRLCF$$

$$N = FCFCRLLRCFCFCFCFCFRL$$

The trail:

$$S'' = S_1 \| N \| S_2$$

will connect the same starting point and finish points that are connected by string S.

One can therefore separate the letter string $T_i$ for i=1, 2, ... m with proper N strings.

In fact one can develop a signal alphabet comprised of any desired number of signal (signal letters) in order to communicate to the recipient a wealth of information about the bit stream that comes its way, or aend a completely unrelated message.

For example N series will be agreed upon to indicate: start of encryption flow, start of a message, break down between letters, end of a message, end of the encryption session. Once could use N strings to add and a hash of the ciphertext. One will have to make sure that none of the agreed upon N alphabets appear naturally in the trail string (no need to).

Using these internal markers it is possible to send dummy strings, decoys that connect no starting point with no finish point for no letter in A. These dummy strings are confusing to the hackers.

3.2.2. Cipher Signaling

When trail $T_1$ is processed by the recipient it points to letter $b_1$ in M as the first letter of message M. This will serve as an indication to the recipient that the next bits start string $T_2$. When $T_2$ is fully processed by the recipient, it is interpreted as letter $b_2$ in M. The next two bits in the ciphertext stream indicate the first step-letter of $T_3$, and so on. This implies that the $T_1$ strings: i=1, 2, ... m can be delivered one right after the other with no indication as to where a new letter starts and where it ends. The intended recipient will not be confused but the attacker will not know where one trail starts and the other trail ends.

3.2.3 Double Bitting

One could identify bit 0 as 01 and bit 1 as 10, thereby leaving the combinations 00 and 11 to serve as indicators on the combined string to identify the individual letter strings, $T_i$. The cost is doubling the number of communicated bits.

3.3 Decryption

The intended recipient upon receiving trail T* is applying it to the starting points of all the letters in A, as marked on the polar lattice space (PLS). The way T* is constructed it will lead from the starting point letter i: $p_i^s$ to the finish point of the same letter: $p_i^f$:

$$p_i^s\text{-}T^* \rightarrow = p_i^f$$

T* being applied to all other letters will not lead to their finish point. This situation will indicate to the recipient that the trail T* sent over to him by the transmitter is pointing to letter $a_i$ which was thereby sent to the recipient.

The process repeats itself letter by letter until the transmitter sends the entire secret message M to the recipient.

3.4 Key Preparation before the PL can operate it must have a ready key. In most ciphers a key is a randomized bit string which can be generated from any proper randomness generating source. The PL key by contrast requires two preparatory operations: (i) key construction, (ii) letter marking.

3.4.1 Key Construction

The extended steps alphabet creates a situation that any trail, T, defined as a series of the step alphabet letters, will move a traveler from any point x on the PLS to some point y thereto, while the counter-reverse trail T' will move a traveler from point y to point x. This universality of travel will take place on any PLS regardless of shape and size.

To construct a PLS one will first select the number of rings in the lattice, r. The larger the value of r, the larger the lattice—the larger the key. Next the PLS constructor will estimate the desired number of points on the lattice, q.

Construction starts by marking the center point of the PLS, point o on some surface (two dimensional). Next the constructor is drawing line $L_1$ which is a horizontal line drawn to the right side of o. At some point x on $L_1$ the constructor will draw ring 1 around the origin point, o, with a radius equal to the distance from o to x. Point x will be $p(i,j,\alpha)=p(1,1,0)$—point at the intersection of ring-1 with ray-1 which is positioned at angle $\alpha=0$.

Using a random number generator the constructor will select how many points to mark on ring 1, $q_1$. Next the constructor will select directions for the desired $q_1$ rays emanating from the center point o, this selection will also be randomized under the condition that $a_i > a_j$ for every $i > j$. we recall that the points on a ring are counted counterclockwise.

When done there are $q_1$ rays that beam out from ring 1. These beams are not marked, not recognized in the area between center point o and ring 1. They beam outward towards and through beams 2 to r.

Next the constructor selects a point x' beyond point x on ray $L_1$, ($|x'-o| > |x-o|$) and draws the second ring around point o with a radius defined by the distance between point o and point x'. This second ring intersects the rays beaming from ring 1 so now the total number of points defined on the lattice is $q_1$ points on the first ring and $q_1$ points on the second ring.

The $q_1$ beam mark $q_1$ points on ring 2, which in turn mark $q_1$ arc sections on ring 2. For every arc section between two marked points on ring 2, the constructor will use a random number generator to select t+1 subsections through marking t points on the arc section. Each of these t points guides the construction of a ray pointing at the origin of the lattice at one end, and pointing outwardly each with its angle $\alpha$. Points on a ring are counted counter clock wise, each higher count point on any arc section will be associated with a direction $\alpha$ larger than the direction $\alpha'$ of the previous point on the ring. By so marking random number of subsections on each section the constructor marked $q_2$ points on ring 2. If the random marking count $q^r > q_2$, then the extra points are eliminated randomly. For the case $q^r < q_2$, the missing points are added randomly. Thereby the count of $q_i$ is maintained through the guidance of randomness, and pattern-less.

This procedure continues until ring r is drawn. Having defined ring i with its $q_i$ points, the constructor is marking a further point on $L_1$, $x_j$ where j=i+1, draws a ring centered around o with a radius of the distance between point o and point $x_j$. Ring j is marked with $q_j$ points through the $q_i$ rays that beam out of ring i towards ring j. Ring j is therefore defined with $q_j$ sections. Each of these $q_j$ sections will be divided to subsections the number of which is randomly selected, and the total number of these subsections will be the number of the points $q_j$ beaming out from ring j to the next ring, ring (j+1).

This sequence continues until the outer ring of the lattice, r. We can say then:

$$q = \Sigma q_i, \text{ from } i=1 \text{ to } i=r$$

3.4.2 Letter Markings

It is important to randomly mark the starting points and the finish points for all the letters of the plaintext alphabet.

Each point will be defined through random number generator generating two random positive integers, R and R' identified as point p(i,j) on ring i and ray j, where i=R MOD r and j=R' MOD $q_i$.

If two letters of A happen to share the same starting point and the same finish point then one or both letters are re-randomized as above.

Note that once the a pair of markers per plaintext alphabet letter is determined, one can switch the designation start-finish at will. And also note that each point in A can be associated with an arbitrary number of start-finish pair points.

4.0 Implementation

The PL cryptography can be implemented in software or in hardware. The polar lattice space can be built through integrated circuitry which will mark the trails. This hardware implementation is ultra fast and because of today's high concentration of integrated chips will allow for a very large key to be used in very small area.

In software the PL space can be kept in a database format where each point is identified through 3 data points: ring count (i), ray count (j), ray direction ($\alpha$), where i=1, 2, ... r. j=1, 2, ... $q_i$, $0 \le \alpha \le 360$. The PLK (The PL key) can be expressed graphically and hence be communicated by depicting it on a screen of a communication device, letting another device to read that screen. The screen will depict the PLS and the starting points and finish points for all the letters in the plaintext alphabet.

5.0 Security Analysis

Given any size ciphertext expressed a an even count bit string c, it can readily be interpreted as a series written in the 4 letters step alphabet. R, L, C, F. Given a sufficiently small arbitrary message M comprising m letters, one could randomly build a PLS, and then mark on it the starting points and finish points of the alphabet A so as to interpret the ciphertext c as the letters of M.

This is easy to do if one allows the number of starting points and finish points per letters to be the number of times that letters appears in M.

Another means for interpreting c as M is the use of decoy letters. Decoy letters, like regular A letters have each a starting point and a finish point, only that when the recipient reconstructs M from the ciphertext c, they ignore every decoy letter.

Brute force plaintext to ciphertext matching may be very productive given that a large variety of lattices may be tested together with a large number of possible letter markers placement.

A PLK can grow while in use. More rings added, more rays added, more places to put starting points and finish points.

Since the PLS size and geometry are randomized, the starting point and finish points placement is randomized, the selection of trail is highly randomized, then the cipher operation is pattern-devoid and cannot be compromised with advanced math and faster computers.

6.0 Extensions and Variations

Extensions and variation options are identified as: (i) Up and Down replacing Close and Far, (ii) randomizing ray span, (iii) higher dimensions lattice, (iv) patterned lattice

6.1 Up and Down Variations

Instead of the marking Closer and Far, C & F as specified, one could use Up an Down. The advantage is that without knowing the position from where to go up or down, the traveler does not know where to go, close or far. Up over the higher half of the lattice, above the horizontal line is 'Far' an Down is 'Close'. On the lower half of the lattice, below the horizontal line, the Up is interpreted as Close and the Down as 'Far'.

6.2 Patterned Lattice

Instead of randomly selected to how many sub sections to divide an arc section when constructing the polar lattice space, one could use a formula, saying for example, any arc section on ring i will be divided to i-3 sections. Such formulaic, pattern-packed construction of the polar lattice will deny it the advantage of randomness but will benefit it with the option to readily build a very large lattice.

6.3 Randomized Key Extension

As described each of the rays starts at a certain ring, g and extends from that point to the outer ring r. This can be replaced with a polar lattice where each ray starts at a random ring $r_s$ and is drawn from there outwardly away from the origin, to a random ring r, where it ends.

6.4 Higher Dimension Lattice

Let $PL_1$ be a polar lattice comprising r rings and q rays.

Let $PL_2$ be a copy of $PL_1$.

Let us put $PL_2$ below $PL_1$, and connect all the $h_1$ points on $PL_i$ each with its matching point on $PL_2$.

One could then extend the step alphabet to allow a traveler to move from point to point on either lattice and also move from one lattice to the other. We will replace the Right Left steps with clockwise, W and counterclockwise, A (anti clockwise) step option. We end up with a 6 letters steps alphabet: W, A, C, F, U, D, where U is UP and D is down. Up on the upper lattice will be interpreted as going to the lowest lattice in this case $PL_2$ on the matching point. And similarly down on the lower lattice is interpreted as moving to the highest lattice, in this case $PL_2$ on the matching point. We with extension, a traveler can move around on either lattice and at will move to the other lattice. Accordingly the starting point and the finish point of any letter can be placed on different lattices. There will be infinite number of trails that will lead from the starting point to the finish point. One will need a 3 bit letter designation to handle the 6 letters steps alphabet. This will leave two combinations of three bits for all sorts signaling and indications.

Let us now add into the lower lattice, $PL_2$ h more rings that are marked between ring 1 and ring r; and also v rays are added between the q rays. $PL_2$ will then become a PL with r'=r+h rings and q'=q+v rays. This will add $f_2$ points to $PL_2$ which will have $q^2=q^1+f_2$ points. These extra $f_2$ points respond to a step Up or step down, by staying put because there is only one lattice now with this point.

Let $PL_3$ be a copy of $PL_2$, and be placed below $PL_2$. Similarly all points on these two lattices will be connected with a line on which one can traverse up and down between $PL_2$ and $PL_3$. Now trails can be readily marked on the complex of three lattice $PL_1$, $PL_2$, $PL_3$, moving inside each or moving from one lattice to the other.

We now repeat the process we used for $PL_2$ versus $PL_1$: add into the lower lattice, $PL_3$ h' more rings that are marked between ring l and ring r'; and also v' rays are added between the q' rays. $PL_3$ will then become a PL with r"=r'+h' rings and q"=q'+v' rays. This will add $f_3$ points to $PL_3$ which will have $q^3=q^3+f_3$ points. These extra $f_3$ points respond to a step down by going to the matching point on $PL_1$. Points on $PL_i$ will respond to a step Up by going to the matching point on $PL_3$.

The process may repeat arbitrary times, creating a three dimensional complex of polar lattices.

6.5 Hardware PLS

The PLS may be built on a hardware surface where the rings and the rays mark conductive lanes and the rest of the surface is an insulator. This will allow a surface abreast electronics to identify a PLS point as the point where the ring current and ray current connect, and thereby the steps of the steps alphabet will be accounted for by shifting either the ray or the ring of the point. This embodiment allows for encryption and decryption to proceed with integrated circuitry speed.

7.0. Review of the Invention

This invention presents a method to encrypt and decrypt information using a key that is comprised of pairs of plaintext letters markers and a secret geometric structure, polar lattice, PL, onto which these pairs of markers are written; there are arbitrary numbers of pairs of letters markers, and the size and the complexity of the PL is open ended so that no claim for brute force cryptanalysis escapes the possibility that the key is comprising a larger PL and more letters markers;

The method is comprising:

(1) a plaintext alphabet, A (ii) a polar lattice structure, PLS, (iii) pairs of markers for the letters in A;

alphabet A is comprising n letters $a_1, a_2, \ldots a_n$;

The PLS is constructed as r concentric rings $R_1, R_2, \ldots R_r$, where point o is their shared center and where the diameter of ring i is smaller than the diameter of ring (i+1) for i=1, 2, ... (r-1);

there are l rays, lines, $L_1, L_2, \ldots, L_l$ emanating from o and crossing all the rings, each ray j is drawn at direction $\alpha_j$, where $\alpha_j < \alpha_{j+1}$ for j=1, 2, ... (l-1) and where $\alpha_1=0$, and where $L_1$ is horizontal, drawn to the right of point o;

each line $L_j$ is recognized from a ring $g_j<r$ to ring r, it is not recognized, not drawn, from ring 1 to ring $g_j$;

the r rings and the l lines intersect q times, each intersection is designated as a point on the PLS; the pair of markers for the letters of A are identified by their point, address, on the PLS.

a given point x on the PLS has at most four neighbors:

(a) a 'far' neighbor which is the point that shares a line with x but is located on the next larger ring (b) a 'close' neighbor which is the point that shares a line with x but is located on the next smaller ring;

(c) a 'right' neighbor which is the point that shares a ring with x but is the next point to x moving in the right direction; the right neighbor is found in the clockwise direction for the upper half of the PLS, $0 \le \alpha \le 180$, and is found in the counterclockwise direction for the lower part of the PLS, $180 < \alpha \le 360$;

(d) a 'left' neighbor which is the point that shares a ring with x but is the next point to x moving in the left direction; the left neighbor is found in the counterclockwise direction for the upper half of the PLS, $0 \le \alpha \le 180$, and is found in the clockwise direction for the lower part of the PLS, $180 < \alpha \le 360$;

a traveler on the PLS who is located at point x will reach the far neighbor through a step on the shared ray further from o; this step is designated as F; travelers move from one point to its neighbor, they don't 'jump'.

a traveler on the PLS who is located at point x will reach the close neighbor through a step on the shared ray closer to o; this step is designated as C;

a traveler on the PLS who is located at point x will reach the right neighbor through a step on the shared ring taken in the right direction; this step is designated as R;

a traveler on the PLS who is located at point x will reach the left neighbor through a step on the shared ring taken in the left direction; this step is designated as L;

the four steps F, C, R, L constitute the steps alphabet $A^s$; a trail, pathway, on the PLS is a sequence of the $A^s$ letters; a trail, T, leads a traveler from point x on the PLS to point y on the PLS;

steps R and L are considered a 'neutralizing pair'; steps F and C are also considered a neutralizing pair; a neutralizing pair returns the traveler to the point before the trail marked by the neutralizing pair;

trail $T^r$ is the reverse trail for T comprising the T steps in the reverse order wherein each step is replaced by the other step in its neutralizing pair; trail T leads a traveler on the PLS from point x to point y; $T^r$ leads a traveler from point y to point x;

a traveler on a point x which is on the outer ring r and on ray $L_j$ when encountered a step F will move to ring $g_j$ on the same ray; that is it will move to another location on the PLS, and the trail will appear disconnected.

a traveler on a point x which is on ray $L_j$ and on ring $g_j$, when encountered a step C will move to ring r on the same ray; that is it will move to another location on the PLS, and the trail will appear disconnected.

each letter $a_i \in A$ has at least one pair of points: a starting point, $p^s_i$ on the PLS, and a finish point $p^f_i$ on the PLS, where i=1, 2, . . . n; each pair of points is used as follows:

letter encryption:

(e.i) to transmit a letter $a_i \in A$, one will draw an arbitrary trail $T_1$ from a certain pair of points $p^s_i$ to $p^f_i$;

(e.ii) the transmitter will then check if applying trail $T_j$ to the starting point of any other letter, $a_j$ in A where i≠j, will lead to the finish point for $a_j$ somewhere along the trail;

(e.iii) if this conflict happens for any $a_j$ then the transmitter will draw another arbitrary trail from $p^s_i$ to $p^f_i$, return to (e.i). Arbitrary redrawing may be algorithmically guided or randomly done.

(e.iv) when a trail $T^*_i$ is drawn that does not lead from the starting point of any letter j, $a_j$, to the finish point of that letter j, $a_j$, then $T^*i$ is transmitted to the intended recipient, as a non-confusing indication that the transmitter sends letter $a_i$.

Letter decryption is being carried out by a recipient who shares the polar lattice key, PLK with the transmitter; the PLK comprising the PLS and the placement of the pairs of points for all the letters in the plaintext alphabet A.

(d.i) the intended recipient, sharing the key, PLK, with the transmitter, will draw $T^*_i$ from the starting point of all the letters $a_k \in A$, for k=1, 2, . . . n and identify letter $a_i$ as the only letter in A for which trail $T^*_i$ leads a traveler from one pair of its starting point $p^s_i$ to $p^f_i$, and thereby conclude that the transmitter transmits letter $a_i$;

message encryption:

any message M written in alphabet A will be transmitted letter by letter according to (e.i) to (e.iv); and the recipient will interpret the series of trails as the letters of M by order; the sequence of trails corresponding to M is the ciphertext C for M. The trails may be packaged in one of many procedural options.

Further in this method, the PLS is constructed as follows: the center point o is marked on an arbitrary spot on a given surface;

a rightward horizontal line is drawn from o, designated as $L_1$;

an arbitrary number of points, r, p(1,1), p(2,1), . . . p(r,1) are marked on $L_1$;

from each of the r points a circle centered around point o is drawn; ring-1, ring-2, . . . ring-r for i=1, 2, . . . r by order do:

mark the k points on ring-1 created with the rays drawn from ring-1 to ring-(i−1), previous points;

on the arc section between every two successive previous points mark an arbitrary number of new points on ring-1; such that the sum of the previous points and the new points on ring i will be an arbitrary number $q_i$: p(i,1), p(i,2), . . . p(i,$q_i$);

through each of the new points on ring i a ray is being drawn from point o, the ray is not marked from point o to ring-1, and is marked from ring-1 and projected away from center point o;

for each of the new points on ring i and the previous points for ring i. measure the angle $\alpha(i,j)$ between point p(i,j), (point j on ring i), and point o.

the set of tuples i-j-$\alpha(i,j)$ represents the information that defines the PLS, each tuple states that the j point on ring i when connected with the origin o through a straight line, the straight line measures an angle $\alpha(i,j)$;

the PLS drawn on the given surface retains its structure and service for the polar lattice cipher under stretching, curving and other topological deformation of the surface.

Further in this method each letter $a_i$ is associated with an arbitrary number of pairs of starting points and finish points, and the transmitter will chose an arbitrary pair each time $a_i$ is to be transmitted.

Further in this method, a second plaintext alphabet A', comprising n' letters a'j, a'$_2$, . . . a'$_{n'}$ is also marked on the PLS; and is used to transmit messages written in the A';

a first recipient is aware of plaintext alphabet A, and knows the starting points and finish points of the letters in the second alphabet A', but does not have the knowledge of the second alphabet A', that is the first recipient does not know which letter in A' a given pair of starting point and finish point represents, and therefore unable to read any message written in the second alphabet A'; the first recipient will disregard letters written in A';

a second recipient is aware of plaintext alphabet A', and knows the starting points and finish points of the letters in the first alphabet A, but does not have the knowledge of the first alphabet A, that is the second recipient does not know which letter in A a given pair of starting point and finish point represents, and therefore unable to read any message written in the first alphabet A; the second recipient will disregard letters written in A;

a third recipient is aware of both plaintext A and the second plaintext A', and knows the starting points and finish points of all the n+n' letters of both A and A'; the third recipient will read messages written in either alphabet.

Further in this method, t alphabets $A_1, A_2, . . . A_t$ are marked on the PLS, and all recipients are aware of the starting points and finish points of all letters of the t alphabets, but each recipient is aware of selected number of alphabets only, and can only decrypt messages written in the selected alphabets.

Further in this method, a trail between a point x and a point y on the PLS is drawn as follows:
  (i) using a source of randomness to select among the four letters of the step alphabet, R, L, C, F, an arbitrary number of times, t, one creates a t steps trail from x to a point x', $T_{xx'}$;
  (i) using a source of randomness to select among the four letters of the step alphabet, R, L, C, F, an arbitrary number of times, s, one creates an s steps trail from y to a point y', $T_{yy'}$;
  (iii) creating a trail from x' to y', $T_{x'y'}$ as follows:
    (iii.a) using either the right step or the left step iteratively one moves from x' to x" which is on the same ring as x' and on the same ray as y': a(x")=a(y');
    (iii.b) if x" is on a larger ring then y', then moving from x" to y' by a series of close (C) steps;
    (iii.c) if x" is on a smaller ring then y', then moving from x" to y' by a series of far (F) steps;
    (iii,d) if x" and y' share a ring then x"=y';
  (iv) Concatenating trail $T_{xx'}$ with $T_{x'y'}$ then with the reverse of $T_{yy'}$ ($T^r_{yy'}$):

$$T_{xy} = T_{xx'} \| T_{x'y'} \| T^r_{yy'}$$

Further in this method, the step alphabet R, C, L, F is written by matching each letter to one of four two bits combination, C=00, F=11, R=01, L=10, and thereby any trail is written as an even numbered bit string, and every even numbered bit string can be interpreted as a trail on the PLS.

Further in this method the step alphabet letters close and far, C and F are replaced with Up and Down, U, and D,
  where U is equivalent to F for the upper half of the PLS (0≤α≤180) and where U is equivalent to C for the lower half of the PLS (180<α≤360);
  and where D is equivalent to C for the upper half of the PLS (0≤α≤180) and where D is equivalent to F for the lower half of the PLS (180<α≤360).

What is claimed is:

1. A method of encrypting and decrypting information, referred to as polar lattice cryptography (PL), utilizing a PL key, PLK, comprising two parts: (i) a geometric structure, a graph, comprised of points and connecting lines, between the points, referred to as a polar lattice structure (PLS), onto which, (ii) at least n pairs of markers are written in secret locations on the PLS, where a marker is a designated point on the PLS, and where each pair of markers represents a certain letter of a transmitter-recipient shared plaintext alphabet A comprising n letters $a_1, a_2, \ldots a_n$ and where each letter of A is associated with at least one pair of markers on the PLS, and where a transmitter transmits a letter $a_i$ of A (i=1, 2, . . . n) to a recipient by sending to them a Corresponding Pathway defined as a series of steps marked on the PLS, where a step corresponds to moving from one point on the PLS to a neighboring point on the PLS, where neighborhood between points is well defined, the Corresponding Pathway leads from one marker of a pair of markers representing letter $a_i$ (i=1, 2, . . . n) to the other marker of the same pair of markers, and where the Corresponding Pathway does not lead from one marker to the other marker of the same pair where the pair of markers represents any other letter $a_j$ for j≠i, each letter of A may be associated with an arbitrary secret number of pairs of markers, marked on arbitrary points on the PLS, and the PLS may be of an arbitrary size and arbitrary configuration, the PL cipher is designed to force the cryptanalyst to use brute-force cryptanalysis, and keep such analysis with a persistent doubt with respect to the identity of the PL key, since it is possible for the PLS to be larger than identified by the cryptanalysis and it is possible for the number of pairs of markers to be larger than identified by the cryptanalysis, the method comprising:

(1) a plaintext alphabet, A, comprising n letters $a_1, a_2, \ldots a_n$;
(ii) a polar lattice structure, PLS;
(iii) an arbitrary number of pairs of markers for each of the letters in the plaintext alphabet A;
the PLS is constructed as r concentric rings $R_1, R_2, \ldots R_r$, where point o is their shared center and where the diameter of ring i is smaller than the diameter of ring (i+1) for i=1, 2 . . . (r−1);
there are l rays or lines, $L_1, L_2, \ldots L_l$ emanating from o and crossing all the rings, each ray j is drawn at direction $\alpha_j$, where $\alpha_j < \alpha_{j+1}$ for j=1, 2, . . . (l−1) and where $\alpha_1 = 0$, and where $L_1$ is horizontal, drawn to the right of point o;
each line $L_j$ is recognized from a ring $g_j < r$ to ring r, it is not recognized or not drawn, from ring 1 to ring $g_j$;
the r rings and the/lines intersect q times, each intersection is designated as a point on the PLS;
a given point x on the PLS has at most four of the following neighbors:
(a) a 'far' neighbor which is the point that shares a line with x but is located on the next larger ring,
(b) a 'close' neighbor which is the point that shares a line with x but is located on the next smaller ring,
(c) a 'right' neighbor which is the point that shares a ring with x but is the next point to x moving in the right direction, the right neighbor is found in the clockwise direction for the upper half of the PLS, 0≤α≤180, and is found in the counterclockwise direction for the lower part of the PLS, 180<α≤360,
(d) a 'left' neighbor which is the point that shares a ring with x but is the next point to x moving in the left direction, the left neighbor is found in the counterclockwise direction for the upper half of the PLS, 0≤α≤180, and is found in the clockwise direction for the lower part of the PLS, 180<α≤360;
a traveler on the PLS who is located at point x will reach the far neighbor through a step on the shared ray moving away from o, this step is designated as F;
a traveler on the PLS who is located at point x will reach the close neighbor through a step on the shared ray moving towards o, this step is designated as C;
a traveler on the PLS who is located at point x will reach the right neighbor through a step on the shared ring taken in the right direction, this step is designated as R;
a traveler on the PLS who is located at point x will reach the left neighbor through a step on the shared ring taken in the left direction, this step is designated as L;
the four steps F, C, R, L constitute a steps alphabet $A^s$, a trail also called a pathway, on the PLS is a sequence of the $A^s$ letters, a trail (T), leads a traveler from point x on the PLS to point y on the PLS;
steps R and L are a 'neutralizing pair', steps F and C are also a neutralizing pair, a neutralizing pair returns the traveler to the point before the part of the trail marked by the neutralizing pair;
trail $T^r$ is the reverse trail for T comprising the T steps in the reverse order wherein each step is replaced by the reverse of its step in its neutralizing pair, trail T leads a traveler on the PLS from point x to point y, $T^r$ leads a traveler from point y to point x;

a traveler on a point x which is on the outer ring r and on ray $L_j$ when encountering a step F will move to ring $g_j$ on the same ray;

a traveler on a point x which is on ray $L_j$ and on ring $g_j$, when encountering a step C will move to ring r on the same ray;

each letter $a_i \in A$ has at least one pair of markers, points, a starting point, $p^s_i$ on the PLS, and a finishing point $p^f_i$ on the PLS, where i=1, 2, . . . n, each pair of points utilized as follows:

regarding letter encryption:

(e.i) to transmit a letter $a_i \in A$, one will draw an arbitrary trail $T_i$ from a certain pair of points $p^s_i$ to $p^f_i$, (e.ii) a transmitter will then check if applying trail $T_i$ to a pair of markers for any other letter, $a_j$ in A where i≠j, will lead from the starting point of that pair to the finishing point of that pair somewhere along the trail, this situation is regarded as "collision", (e.iii) if collision happens for any $a_j$ then the transmitter will draw another arbitrary trail from $p^s_i$ to $p^f_i$, return to (e.i), (e.iv) when a trail $T^*_i$ is drawn that does not lead from the starting point of any pair of markers representing letter j, $a_j$, to the finishing point of that pair of markers, namely $T^*_i$ is collision free, then $T^*_i$ is regarded as the Corresponding Pathway for letter $a_i$, and by transmitting this Corresponding Pathway the transmitter transmits letter $a_i$ to an intended recipient, regarding letter decryption:

letter decryption is implemented by a recipient who shares a polar lattice key (PLK) with the transmitter, the PLK comprising the PLS and the placement on the PLS of all the pairs of markers for all the letters in the plaintext alphabet A, (d.i) the intended recipient, sharing the key PLK, with the transmitter, will draw the Corresponding Pathway, $T^*_i$, for letter $a_i$, from all the starting points of all the pairs of markers representing any of the letters $a_k \in A$, for k=1, 2 . . . n and identify letter $a_i$ as the only letter in A for which the Corresponding Pathway, trail $T^*_i$ leads a traveler from a starting point $p^s_i$ of a pair of markers representing letter $a_i$ to $p^f_i$, the finishing point for that pair, and thereby conclude that the transmitter transmits letter $a_i$;

regarding message encryption:

any message M written in alphabet A will be transmitted letter by letter according to (e.i) to (e.iv), and the recipient will interpret the series of trails as the letters of M by order, the sequence of trails corresponding to M is the ciphertext CT for M.

2. The method of claim 1 where the PLS is further constructed as follows:

the center point o is marked on an arbitrary spot on a given surface;

a rightward horizontal line is drawn from o, designated as $L_1$;

an arbitrary number of points, r, p(1,1), p(2,1), . . . p(r,1) are marked on $L_1$;

from each of the r points a circle centered around point o is drawn, ring-1, ring-2, . . . ring-r;

for i=1, 2, . . . r by order do:

mark the k points on ring-i created with the rays drawn from ring-1 to ring-(i−1), Previous Points, on the arc section between every two successive Previous Points mark an arbitrary number of new points on ring-i, with the sum of the Previous Points and the new points on ring i becoming an arbitrary number $q_i$: p(i,1), p(i,2) . . . p(i,$q_i$), through each of the new points on ring i, a ray is being drawn from point o, the ray is not marked from point o to ring-i, and is marked from ring-i and projected away from center point o, for each of the new points on ring i and the Previous Points for ring i, measure the angle $\alpha(i,j)$ between the line defined by point p(i,j), (point j on ring i), and point o and the horizontal line;

the set of tuples i-j-$\alpha(i,j)$ represents the information that defines the PLS, each tuple states that the j point on ring i when connected with the origin o through a straight line, the straight line measures an angle $\alpha(i,j)$ relative to the horizontal line;

the PLS drawn on the given surface retains its structure and service for the polar lattice cipher under stretching, curving and other topological deformation of the surface.

3. The method of claim 1 where each letter $a_i$ is associated with an arbitrary number, $m_i$, of $a_i$ representing pairs of markers, each pair has an arbitrarily placed starting point on the PLS and an arbitrarily placed finishing point, on the PLS with the transmitter choosing an arbitrary pair from the $m_i$ pairs, each time $a_i$ is to be transmitted.

4. The method of claim 1 where a second plaintext alphabet A', comprising n' letters $a'_1$, $a'_2$, . . . $a'_{n'}$, is also marked on the PLS, and is used to transmit messages written in the A' alphabet;

where a first recipient is aware of plaintext alphabet A, and knows the corresponding pairs of markers, namely the starting points and finishing points of the letters in alphabet A, but does not have the knowledge of the second alphabet A', that is the first recipient does not know A' and does not know the pairs of markers marked on the PLS and corresponding to the letters in alphabet A', and therefore the first recipient is unable to read any message written in the second alphabet A', the first recipient will disregard letters written in A';

where a second recipient is aware of plaintext alphabet A', and knows the corresponding pairs of markers, namely the starting points and finishing points of the letters in alphabet A', but does not have the knowledge of the first alphabet A, that is the second recipient does not know A and does not know the pairs of markers marked on the PLS and corresponding to the letters in alphabet A, and therefore the second recipient is unable to read any message written in the first alphabet A, the second recipient will disregard letters written in alphabet A;

where a third recipient is aware of both plaintext A and the second plaintext A', and knows the starting points and finishing points of all the pairs of markers corresponding with the n+n' letters of both A and A', the third recipient will read messages written in either alphabet.

5. The method of claim 4 where t alphabets $A_1$, $A_2$, . . . $A_t$ have each their own pairs of markers marked on the PLS, and each recipient is aware of a selected number of alphabets and their corresponding pairs of markers, and can only decrypt messages written in the selected alphabets of which a recipient is aware.

6. The method of claim 1 where a trail between a point x and a point y on the PLS is drawn as follows:

(i) using a source of randomness to select among the four letters of the step alphabet, $A^s$, R, L, C, F, an arbitrary number of times, t, one creates a t steps trail from x to a point x', $T_{xx'}$;

(ii) using a source of randomness to select among the four letters of the step alphabet, $A^s$, R, L, C, F, an arbitrary number of times, s, one creates a s steps trail from y to a point y', $T_{yy'}$;

(iii) creating a trail from x' to y', $T_{x'y'}$ as further follows:
  (iii.a) using either the right step or the left step iteratively one moves from point x' to point x" which is on the same ring as x' and on the same ray as y': $\alpha(x'') = \alpha(y')$,
  (iii.b) if x" is on a larger ring then y', then moving from x" to y' by a series of close (C) steps,
  (iii.c) if x" is on a smaller ring then y', then moving from x" to y' by a series of far (F) steps,
  (iii,d) if x" and y' share a ring then x"=y';

(iv) Concatenating trail $T_{xx'}$ with $T_{x'y'}$ then with the reverse of $T_{yy'}$ ($T^r_{yy'}$):

$$T_{xy} = T_{xx'} | T_{x'y'} | T^r_{yy'}.$$

7. The method of claim 1 where the step alphabet $A^s$ comprising the letters R, C, L, F is written by matching each letter to one of four two bits combination, C=00, F=11, R=01, L=10, with any trail written as an even numbered bit string, and every even numbered bit string interpreted as a trail on the PLS.

8. The method of claim 1 where the step alphabet letters close and far, C and F, are replaced with Up and Down, U and D;

where U is equivalent to F for the upper half of the PLS ($0 < \alpha \leq 180$) and where U is equivalent to C for the lower half of the PLS ($180 < \alpha \leq 360$);

and where D is equivalent to C for the upper half of the PLS ($0 \leq \alpha \leq 180$) and where D is equivalent to F for the lower half of the PLS ($180 < \alpha \leq 360$).

\* \* \* \* \*